United States Patent
Kim et al.

(10) Patent No.: US 9,936,398 B2
(45) Date of Patent: Apr. 3, 2018

(54) METHOD AND APPARATUS FOR CANCELLING AN INTERFERENCE IN WIRELESS COMMUNICATION SYSTEM

(71) Applicant: Samsung Electronics Co., Ltd., Suwon-si, Gyeonggi-do (KR)

(72) Inventors: Taeyoon Kim, Seongnam-si (KR); Mingoo Kim, Hwaseong-si (KR); Jonghan Lim, Seoul (KR); Chaeman Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 14/193,029

(22) Filed: Feb. 28, 2014

(65) Prior Publication Data
US 2014/0243030 A1    Aug. 28, 2014

(30) Foreign Application Priority Data
Feb. 28, 2013    (KR) .................. 10-2013-0022242

(51) Int. Cl.
| | |
|---|---|
| H04B 7/00 | (2006.01) |
| H04B 15/00 | (2006.01) |
| H04W 24/02 | (2009.01) |
| H04J 11/00 | (2006.01) |
| H04B 1/7107 | (2011.01) |

(52) U.S. Cl.
CPC .......... *H04W 24/02* (2013.01); *H04B 1/7107* (2013.01); *H04J 11/0046* (2013.01); *H04J 11/0056* (2013.01)

(58) Field of Classification Search
CPC . H04J 11/0056; H04W 24/02; H04W 52/243; H04W 72/082

USPC ...................................................... 455/501
See application file for complete search history.

(56) References Cited

U.S. PATENT DOCUMENTS

| | | | |
|---|---|---|---|
| 6,714,775 B1 * | 3/2004 | Miller | 455/296 |
| 8,401,112 B2 | 3/2013 | Chao | |
| 2009/0245091 A1 * | 10/2009 | Lin et al. | 370/210 |
| 2010/0190447 A1 | 7/2010 | Agrawal et al. | |
| 2011/0080981 A1 | 4/2011 | Su et al. | |
| 2011/0292974 A1 | 12/2011 | Lamba et al. | |
| 2013/0114437 A1 * | 5/2013 | Yoo et al. | 370/252 |

FOREIGN PATENT DOCUMENTS

| | | |
|---|---|---|
| KR | 1020110129412 A | 12/2011 |
| WO | 03-041350 A1 | 5/2003 |
| WO | 2009107079 A1 | 9/2009 |

OTHER PUBLICATIONS

Marwan Aldroubl, "Collaborative modulation multiple access for single hop and multihop networks", Doctoral thesis, University of Sussez, Aug. 17, 2012.

* cited by examiner

*Primary Examiner* — Ankur Jain
(74) *Attorney, Agent, or Firm* — Jefferson IP Law, LLP

(57) ABSTRACT

A method and an apparatus for cancelling interference in a wireless communication system are provided. The method includes acquiring interference signal information on a reception signal received from a base station based on a preconfigured constellation set, and cancelling an interference signal from the reception signal by using the acquired interference signal information. Accordingly, reception performance in a cell edge can be improved by acquiring dominant interference signal information.

17 Claims, 11 Drawing Sheets

(a) PC1: SFBC(QPSK) / Rank1(QPSK)

[b] PC2: SFBC(16QAM) / Rank1(16QAM)

(c) PC3: Rank2(QPSK+QPSK)

(d) PC4: Rank2(QPSK+16QAM)

(d) PC4: Rank2(16QAM+16QAM)

METHOD AND APPARATUS FOR CANCELLING AN INTERFERENCE IN WIRELESS COMMUNICATION SYSTEM

CROSS-REFERENCE TO RELATED APPLICATION(S)

This application claims the benefit under 35 U.S.C. § 119(a) of a Korean patent application filed on Feb. 28, 2013 in the Korean Intellectual Property Office and assigned Serial number 10-2013-0022242, the entire disclosure of which is hereby incorporated by reference.

TECHNICAL FIELD

The present disclosure relates to a wireless communication system. More particularly, the present disclosure relates to a method and apparatus for cancelling interference in a wireless communication system.

BACKGROUND

Generally, a wireless communication system has been developed to guarantee user's activity and provide a voice service. However, the wireless communication system has gradually expanded its scope of service to include a data service besides voice service, and, in recent years, the wireless communication system has developed to a high speed data service. However, in the wireless communication system providing current services, since resources have become insufficient and users want much higher speed services, more developed wireless communication system are required.

To satisfy these needs, the standardization of Long Term Evolution (LTE), which is one of the systems developed as next generation wireless communication system, is ongoing in the 3rd Generation Partnership Project (3GPP).

Long Term Evolution (LTE) technology implements high speed packet based communication supporting maximum 100 Mbps transmission speed. To this end, various methods are discussed. For example, there is a method of reducing the number of nodes positioned on the communication path by simplifying a network structure or a method of approaching wireless protocols to wireless channel as close as possible.

In the Multiple-Input Multiple-Output-Orthogonal Frequency-Division Multiple Access (MIMO-OFDMA) wireless communication system like the LTE, a terminal receives information only for demodulating data from a serving base station. However, in the area like cell edge, where an interference signal is strongly received from an adjacent base station, if the terminal knows about the information on the interference signal, the terminal can improve its reception performance by handling (joint detection, interference cancellation, and the like) the information. However, in general, there are many different kinds of information of interference signals to improve a terminal's reception performance. Therefore, the complexity of a method to find out the many different kinds of interference signal information can be increased.

Accordingly, a study of acquiring interference signal information with low complexity is required to enhance a terminal's reception performance.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for cancelling interference in a wireless communication system without support from a serving base station.

The present disclosure may further provide a method and apparatus for forming a constellation set (pattern) corresponding to a pattern of interference signal interference in a wireless communication system, and cancelling the interference signal based on the constellation set.

In accordance with an aspect of the present disclosure, a method of cancelling interference of a terminal in a wireless communication system is provided. The method includes acquiring interference signal information on a reception signal received from a base station based on a preconfigured constellation set, and cancelling an interference signal from the reception signal by using the acquired interference signal information.

In accordance with another aspect of the present disclosure, a terminal for cancelling an interference signal in a wireless communication system is provided. The terminal includes a wireless communication unit configured to transmit and receive a signal with a base station, a storage unit configured to store a constellation set including at least one constellation corresponding to a pattern of interference signal, and a controller configured to acquire interference signal information on a reception signal received from the base station, and cancel the interference signal from the reception signal by using the acquired interference signal information, based on the constellation set.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, a method for acquiring interference signal information is described as an example of a Long Term Evolution (LTE)/Long Term Evolution-Advanced (LTE-A) system, but it is not limited thereto. The method can be applied to the other wireless communication systems having similar technical features.

Figure 1:
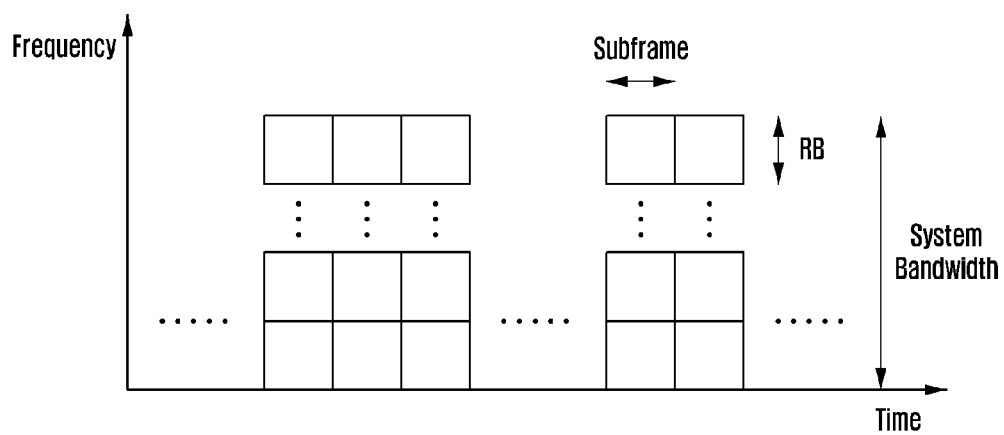
FIG. 1 is a diagram illustrating time and frequency resources in Long Term Evolution (LTE)/Long Term Evolution-Advanced (LTE-A) system according to an embodiment of the present disclosure.

FIG. 1 is a diagram illustrating time and frequency resources in an LTE/LTE-A system according to an embodiment of the present disclosure.

Referring to FIG. 1, the wireless resources that a base station transmits to a terminal is divided by a Resource Block (RB) unit in a frequency axis, and by a subframe unit in a time axis.

Generally, the RB includes 12 subcarriers, and occupies 180 kHz bandwidth in an LTE/LTE-A system. On the other hand, generally, the subframe includes 14 OFDM symbol sections in an LTE/LTE-A system, and occupies 1 msec time section.

When performing scheduling in an LTE/LTE-A system, resources may be allocated by a subframe unit in a time axis, and by an RB unit in a frequency axis.

Figure 2:
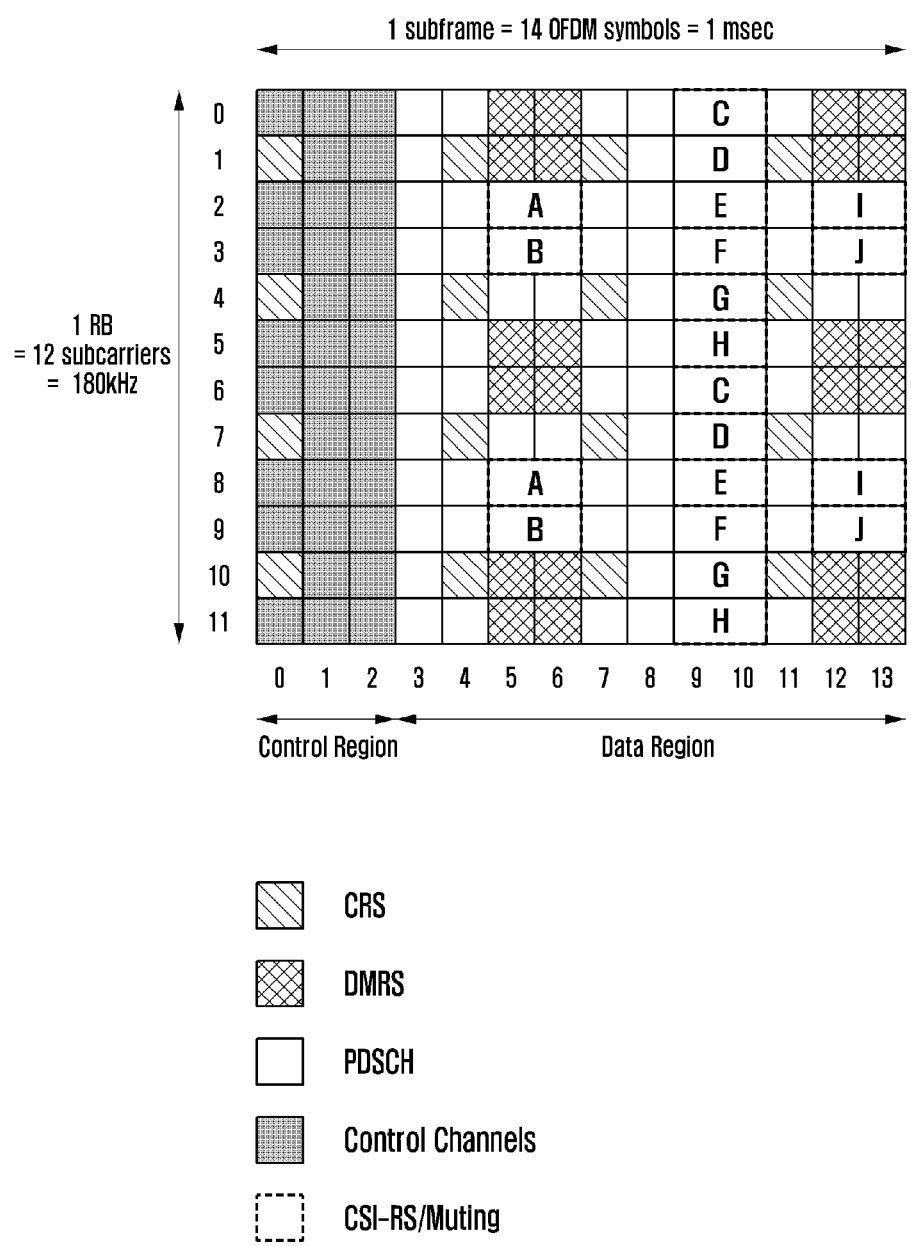
FIG. 2 is a diagram illustrating one sub-frame and one resource block (RB) which is a minimum unit for downlink scheduling in an LTE/LTE-A system according to an embodiment of the present disclosure.

FIG. 2 is a diagram illustrating one sub-frame and one resource block (RB) which is a minimum unit for downlink scheduling in an LTE/LTE-A system according to an embodiment of the present disclosure.

Referring to FIG. 2, wireless resources are configured with one subframe in a time axis, and one RB in a frequency axis. Such wireless resources include 12 subcarriers in a frequency domain and 14 OFDM symbols in a time domain, so that the wireless resources have 168 unique frequency and time positions.

In LTE/LTE-A, each unique frequency and time position of FIG. 2 is called a Resource Element (RE). In addition, one subframe is configured with 2 slots while each slot includes 7 OFDM symbols.

A plurality of different kinds of signals can be transmitted to wireless resources illustrated in FIG. 2.

Cell Specific RS (CRS) is a reference signal which is transmitted for all terminals belong to one cell.

Demodulation Reference Signal (DMRS) is a reference signal which is transmitted for a specific terminal.

Physical Downlink Shared Channel (PDSCH) is a downlink data channel used by base station so as to transmit traffic to a terminal, and the traffic is transmitted by using RE to which reference signal is not transmitted in the data region of FIG. 2.

Channel Status Information Reference Signal (CSI-RS) is a reference signal which is transmitted for the terminals belonging to one cell, and used for measuring channel status between terminal and base station. In this case, a plurality of CSI-RSs can be transmitted to one cell.

Other control channels (PHICH, PCFICH, PDCCH) provide control information necessary for receiving PDSCH by a terminal, or transmit ACK/NACK for operating HARQ for uplink data transmission.

Figure 3:
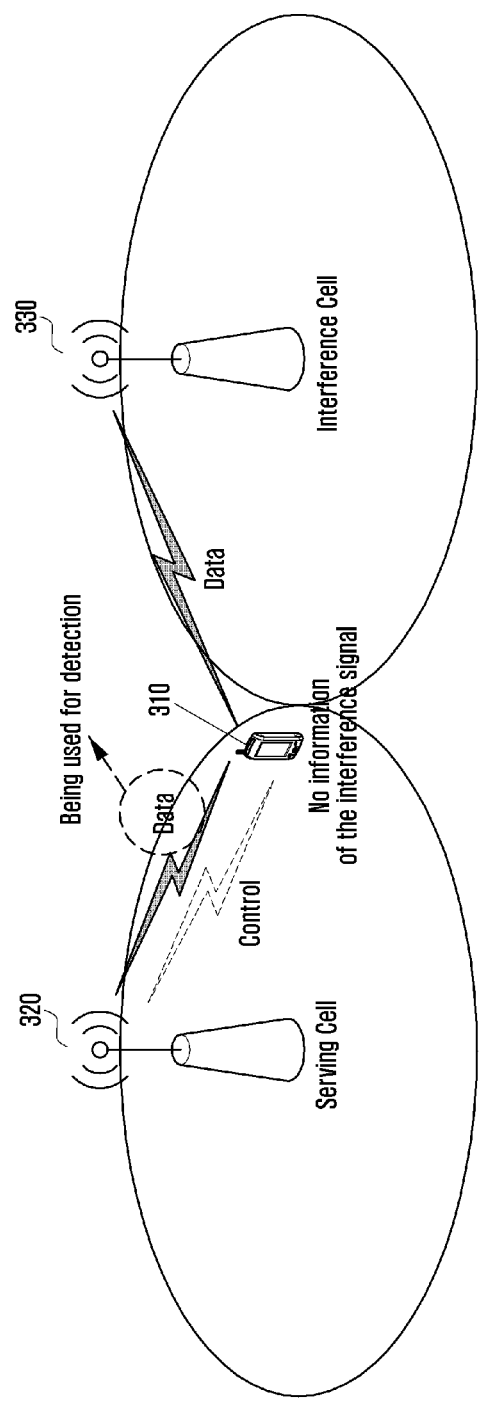
FIG. 3 is a diagram illustrating a normal terminal's data reception method in a cell edge area according to an embodiment of the present disclosure.

FIG. 3 is a diagram illustrating a normal terminal's data reception method in a cell edge area according to an embodiment of the present disclosure.

A serving cell 320 provides a service to a terminal 310, and, to this end, the terminal 310 transmits/receives control information and data to/from the serving cell 320. In a general MIMO-OFDMA system including 3GPP LTE, the terminal receives only information for demodulating data which is allocated to itself from a serving cell.

Meanwhile, an interference cell 330, which interferes with terminal 310, can be located close to the serving cell 320. In this case, a signal that the interference cell 330 transmits to other terminals located in the interference cell's own service coverage can be also received by terminal 310. In this case, the signal operates as interference for the terminal 310.

Generally, since the terminal 310 does not have information on the interference signal transmitted from the interference cell 330 and the base station does not transmit information on the interference, the terminal 310 is limited on improving a performance of the receiving signal from the serving cell 320. Therefore, if the terminal 310 is able to know information of the inter-cell interference signal, the terminal having an advanced receiver can improve performance in the cell edge by using an inter-cell interference signal with the method of joint detection or interference cancellation, and the like, when demodulating a serving signal.

However, since there are so many different kinds of information on interference signals that should be known, the method for finding out the different kinds of information becomes more complicated affecting the performance of the system.

In 3GPP LTE, the terminal should know the information such as a transmission mode of the interference signal, the number of layer, the modulation order of the signal, and the precoding matrix, and the like, when performing joint detection of a dominant interference signal and its own signal to improve performance in the cell edge.

If the terminal does not know any information among them, there are a number of cases such as a multiple of transmission mode, the number of layer, modulation order, and the number of precoding matrix, that terminal should attempt to cancel an interference signal considering all the number of cases.

However, if the terminal attempts to cancel an interference signal considering all the number of cases, complexity becomes too high and processing time can be delayed.

Problems of the related art are summarized as follows.

1. The related art detects a signal only by using information on a serving signal provided by a serving base station, such that the performance of terminal degrades in the cell edge which is strongly affected by inter-cell interference.

2. The related art has a limitation of improving performance by whitening a colored noise because there is no information of an interference signal.

3. Acquiring interference signal information has a problem of high complexity because there are so many numbers of configurations of an interference signal that can occur.

The present disclosure has been made in view of the above problems, and more particularly, the present disclosure suggests a method of acquiring interference signal information having low complexity for improving a terminal's reception performance in the cell edge.

In particular, a terminal according to the present disclosure may acquire interference signal information based on a predetermined set (or pattern) of a constellation without a base station's assistance, and cancel an interference signal.

According to an embodiment of the present disclosure, a terminal may acquire interference signal information based on a set of constellations which are configured with a precoded symbol (hereinafter, it will be used together with a precoding symbol) unit.

Figure 4:
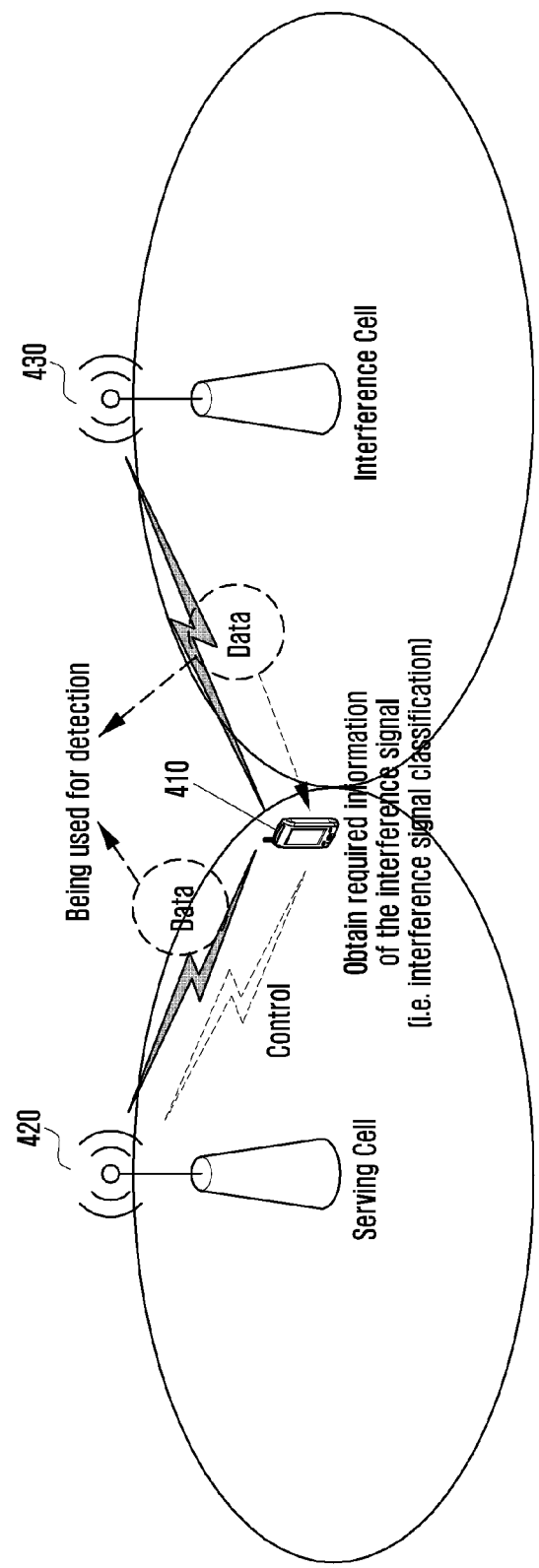
FIG. 4 is a diagram illustrating a terminal's data reception method according to an embodiment of the present disclosure.

FIG. 4 is a diagram illustrating a terminal's data reception method according to an embodiment of the present disclosure.

A serving cell 420 provides a service to a terminal 410 of the present disclosure in a cell edge area. The terminal 410 may transmit/receive control information and data to/from the serving cell 420. In this case, the terminal 410 may be interfered by the interference cell 430 which is an adjacent cell.

The terminal 410 according to an embodiment of the present disclosure may acquire interference signal information without the assistance of a serving base station, and decode a serving signal transmitted from the serving cell 420 by using the acquired interference signal information. To this end, the terminal 410 may previously configure a set of constellations (or, a precoding symbol constellation set, hereinafter, used together) which correspond to the pattern of an interference signal. In addition, the terminal 410 may classify the interference signal not by a modulation symbol unit but by a precoding symbol unit, then the terminal 410 may acquire interference signal information by comparing the precoding symbol constellation set and the interference signal of the precoding symbol unit.

Hereinafter, the method for acquiring interference signal information without assistance of a serving base station or an adjacent base station is described in detail.

If a dominant interference signal is strongly received at the cell edge, it is possible to improve the reception performance of the terminal by detecting an interference signal component. However, this interference signal information is not the information which is given by the base station. Therefore, the terminal should find out necessary information. To this end, the terminal should know a transmission method, the number of layers of a transmission signal, the precoding information and the modulation method in the MIMO-OFDMA system.

In case of 2×2 MIMO interference signal, the number of transmission layer (L) may be 1 or 2, accordingly, the received signal may be expressed like Equation 1.

$$y = HP_1 x + n, \quad \text{when } L = 1 \qquad \text{Equation 1}$$
$$= \begin{bmatrix} H^{00} & H^{01} \\ H^{10} & H^{11} \end{bmatrix} \begin{bmatrix} P_1^0 \\ P_1^2 \end{bmatrix} x + \begin{bmatrix} n^0 \\ n^1 \end{bmatrix},$$

$$y = HP_2 x + n, \quad \text{when } L = 2$$
$$= \begin{bmatrix} H^{00} & H^{01} \\ H^{10} & H^{11} \end{bmatrix} \begin{bmatrix} P_2^{00} & P_2^{01} \\ P_2^{10} & P_2^{11} \end{bmatrix} \begin{bmatrix} x^0 \\ x^1 \end{bmatrix} + \begin{bmatrix} n^0 \\ n^1 \end{bmatrix},$$

Where y is a received signal, n is a noise, H is 2×2 channel matrix, Pn is a precoding matrix of rank n, and x is modulated symbol vector.

Since there are so many unknown parameters which should be known for each of the above variables, complexity should be considerably increased, when totally classifying the transmission method of interference signal, the number of layer for transmission signal, the precoding information and the modulation method.

The present disclosure performs a joint detection which handles interference signal in a symbol level, and a classification of interference signals for symbol-level advanced receivers such as a symbol-level cancellation.

To this end, according to an embodiment of the present disclosure, the transmission method of an interference signal, the number of layers of a transmission signal, the precoding information, and the modulation method are not individually classified, but classified as combined information.

That is, the combined information is not classified by the symbol of a transmitted modulation order but by using the precoded modulation symbol (precoding symbol) as following Equation 2.

$$y = H\tilde{x} + n, \qquad \text{Equation 2}$$
$$= \begin{bmatrix} H^{00} & H^{01} \\ H^{10} & H^{11} \end{bmatrix} \begin{bmatrix} \tilde{x}^0 \\ \tilde{x}^1 \end{bmatrix},$$
$$= \begin{cases} \begin{bmatrix} H^{00} & H^{01} \\ H^{10} & H^{11} \end{bmatrix} \begin{bmatrix} P_1^0 x \\ P_1^1 x \end{bmatrix}, & \text{when } L = 1 \\ \begin{bmatrix} H^{00} & H^{01} \\ H^{10} & H^{11} \end{bmatrix} \begin{bmatrix} P_2^{00} x^0 + P_2^{01} x^1 \\ P_2^{10} x^0 + P_2^{11} x^1 \end{bmatrix}, & \text{when } L = 2 \end{cases}$$

The present disclosure may acquire interference signal information in a precoding symbol unit expressed in the form of px in the Equation 1, and use the acquired interference signal information for a joint detection. As mentioned above, when performing the joint detection for the serving signal and the interference signal classified in a precoding symbol unit, the precoded symbol may be used as Equation 3.

$$y = H_{eq} x_{eq}, \qquad \text{Equation 3}$$

-continued $$= [H_d P_n \quad H_i] \begin{bmatrix} x_d \\ \tilde{x}_i \end{bmatrix}$$

As expressed above, when the joint detection is performed by using the classified interference signal (i.e., precoded symbol), the Log Likehood Ratio (LLR) may be calculated as following Equation 4.

$$L_{1,n} = \ln \sum_{x_i \in S_m^2} \sum_{x_d \in C_{d,+1}^2} \exp\left(-\frac{1}{\sigma^2}\|y - H_{eq,d}x_d - H_i\tilde{x}_i\|^2\right) P(\tilde{x}_i) -$$
$$\ln \sum_{x_i \in S_m^2} \sum_{x_d \in C_{d,-1}^2} \exp\left(-\frac{1}{\sigma^2}\|y - H_{eq,d}x_d - H_i\tilde{x}_i\|^2\right) P(\tilde{x}_i)$$
$$= \max_{x_i \in S_m^2, x_d \in C_{d,+1}^2} \left\{-\frac{1}{\sigma^2}\|y - H_{eq,d}x_d - H_i\tilde{x}_i\|^2 + \ln P(\tilde{x}_i)\right\} -$$
$$\max_{x_i \in S_m^2, x_d \in C_{d,-1}^2} \left\{-\frac{1}{\sigma^2}\|y - H_{eq,d}x_d - H_i\tilde{x}_i\|^2 + \ln P(\tilde{x}_i)\right\}$$

Equation 4

Where, L1,n is LLR of nth bit of first stream, s2 is noise variance, is a prior distribution of $\tilde{x}_i$ and can be previously calculated on the assumption that each modulation order is equiprobable. Sm is a constellation point set of precoded symbols set m, C2d is constellation point set of a desired symbol vector, C2d,α is symbol vector set satisfying bl,n=α. (bl,n is n-th bit of 1-th stream).

It will be described as an example that a base station having 2Tx antenna and a terminal having 2Rx antenna perform the joint detection of a serving signal and a dominant interference signal in an LTE system.

It is assumed that the number of cases for information that the dominant interference signal can have is expressed as following in Table 1.

TABLE 1

Transmission mode: 2, 3, 4, 6
The number of layer: 1 or 2
Modulation order: QPSK or 16QAM According to the above assumption, combinable precoding symbols for the interference signal may be expressed by 5 kinds (pattern) of precoding symbol constellation sets illustrated in FIGS. 5A to 5E.

Figure 5A:
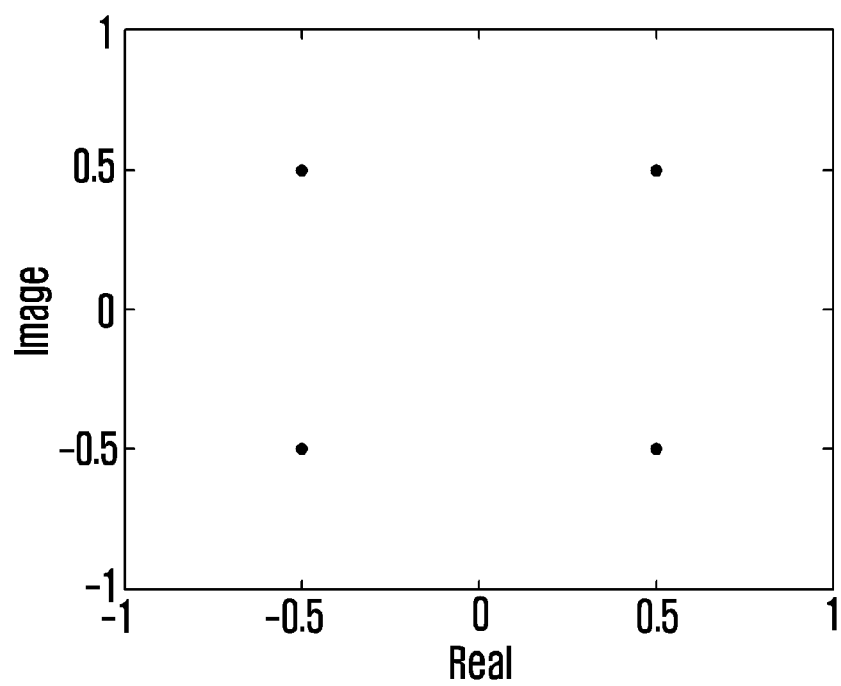
FIGS. 5A, 5B, 5C, 5D and 5E are diagrams illustrating a free coding constellation set which can be combined according to an embodiment of the present disclosure.
Figure 5B:
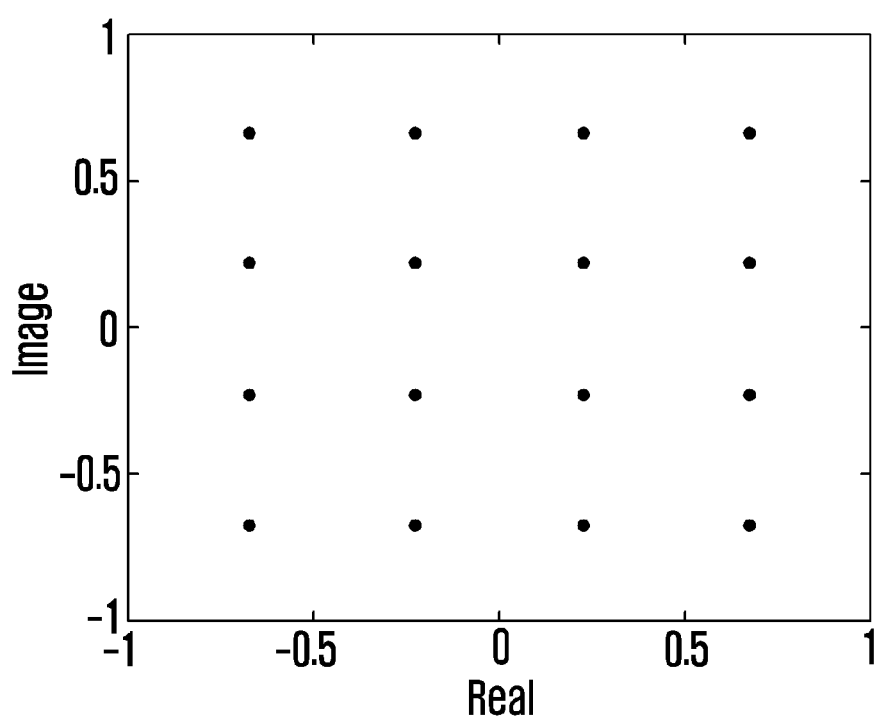
Figure 5C:
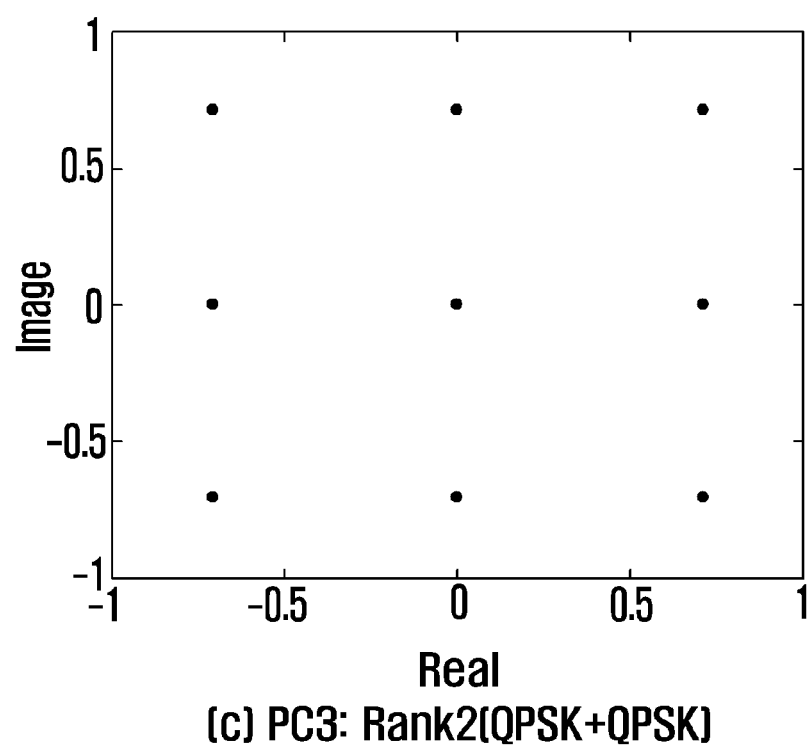
Figure 5D:
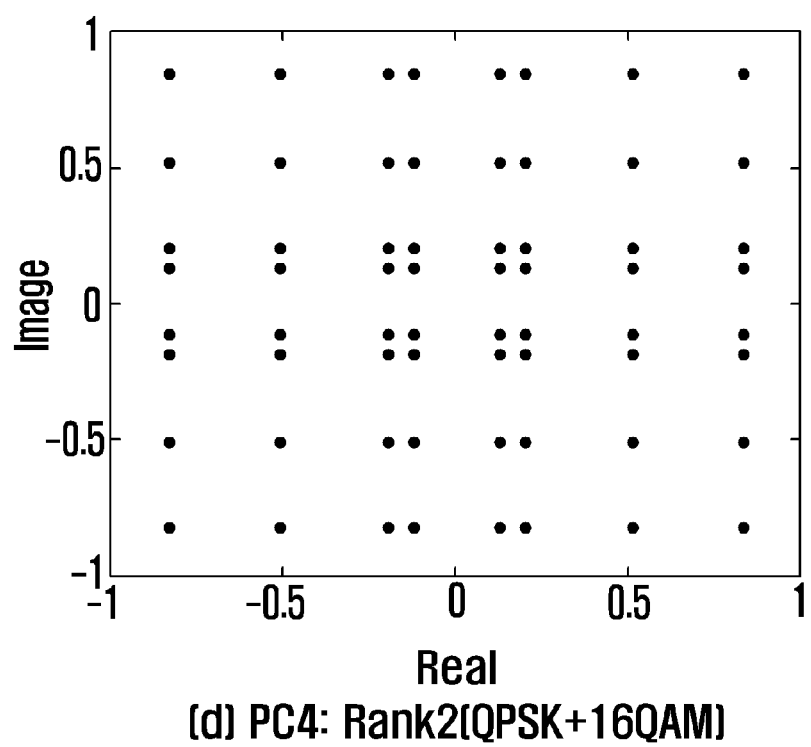
Figure 5E:
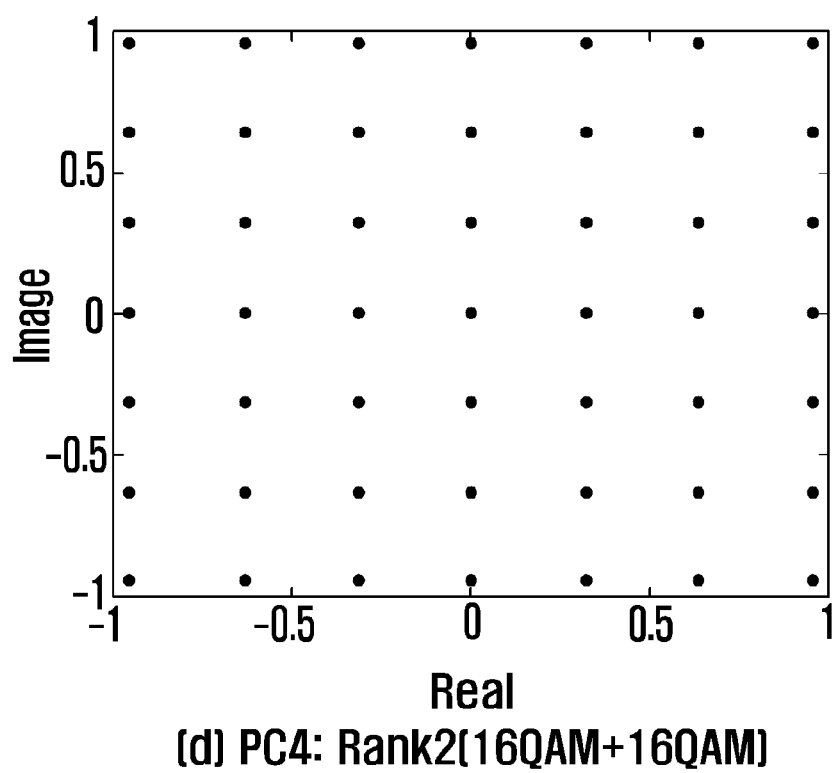

FIGS. 5A and 5B are constellations in case of 1 layer, FIG. 5C, 5D, and 5E are constellations in case of 2 layers according to an embodiment of the present disclosure.

FIG. 5A is a constellation when QPSK is used for modulation order, and FIG. 5B is a constellation when 16 QAM is used for modulation order.

FIG. 5C is a constellation when QPSK is used for each layer, FIG. 5D is a constellation when QPSK and 16 QAM are used for each layer, and FIG. 5E is a constellation when 16 QAM is used for each layer.

According to the assumptions of Table 1, combinable precoding symbol of interference signal corresponds to one of 5 sets of constellation defined in the sets of precoding symbol constellations.

Therefore, according to an embodiment of the present disclosure for acquiring interference signal information in a precoding symbol unit, complexity can be reduced (from 16 to 5) compared with the number of cases(4*2+4*4=24) when interference signal is acquired in a modulation symbol unit.

Figure 6:
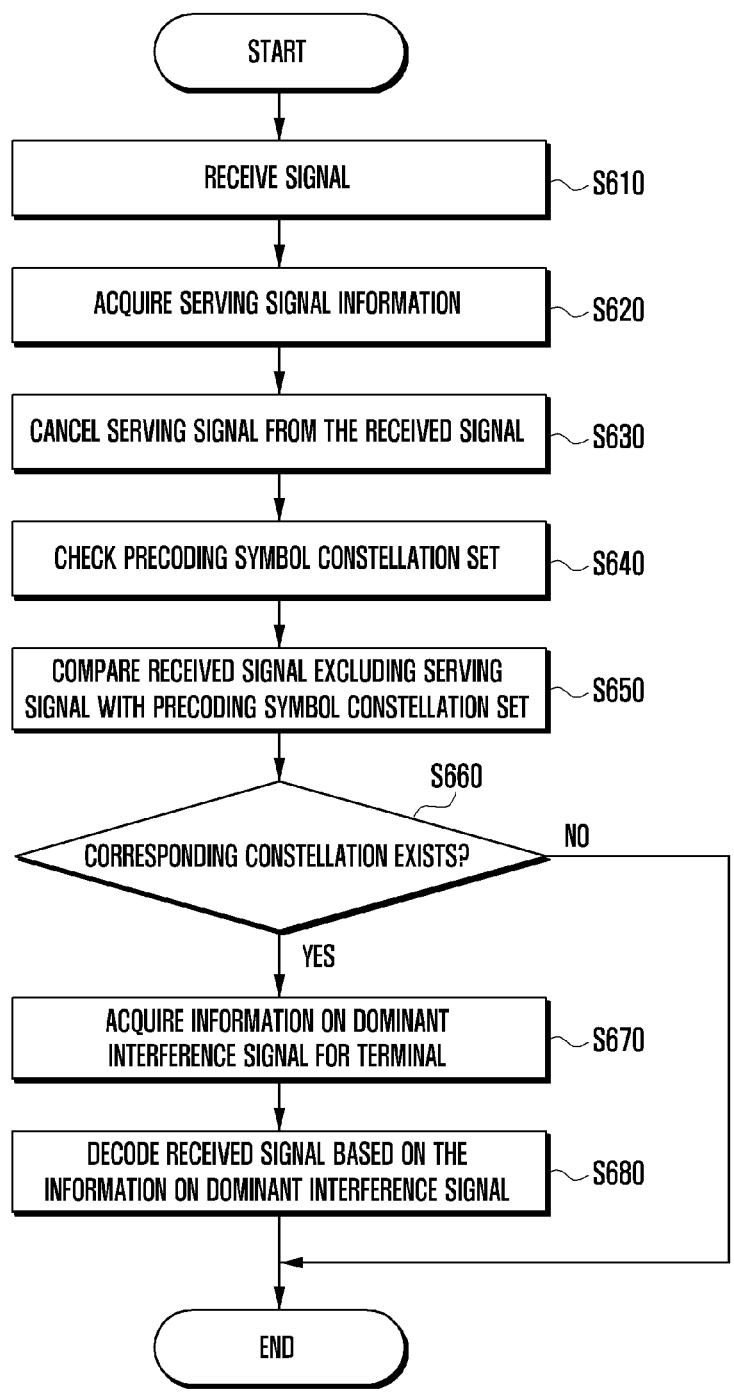
FIG. 6 is a flowchart illustrating a process of acquiring interference signal information by a terminal according to an embodiment of the present disclosure.

FIG. 6 is a flowchart illustrating a process of acquiring information of an interference signal by a terminal according to an embodiment of the present disclosure.

First, the terminal may receive a signal at operation 610. The signal received by the terminal may include a serving signal to be received from a serving cell, and an interference signal interfered by an interference cell.

The terminal may acquire serving signal information at operation 620. The reason for such is that the terminal is to acquire an interference signal component by canceling the serving signal from the received signal.

At the operation where the terminal classifies dominant interference signal, the serving signal has only information such as modulation order, and the like, but the actually transmitted symbol is not detected yet. Accordingly, in order to cancel the serving signal from the received signal, the terminal only can use the information such as modulation order, and the like. In this case, there may be two methods as follows.

First method is to use serving data signal (soft cancellation).

This method may be used in a case in which the decoding/detection is performed, firstly, only by using the serving signal not by joint detection, and then, the joint detection is performed after the detection fails. That is, after the non-joint detection/decoding is performed first, a soft symbol is regenerated by using the decoder output to cancel each other. The optimal interference classification according to above method is expressed as Equation 5.

$$\hat{m} = \operatorname*{argmax}_{m \in M} \left\{ \prod_{k=1}^{K} \sum_{\tilde{x}_i \in S_m^2} \frac{1}{(\pi\sigma^2)^2} \exp\left(-\frac{1}{\sigma^2}\|\tilde{Y}(k) - H_i(k)\tilde{x}_i\|^2\right) P(\tilde{x}) \right\}$$

Equation 5

Where, $\tilde{Y}(k)$ is a received signal in k-th subcarrier after canceling a soft regeneration of desired signal, K is the number of sample for classification, and $P(\tilde{x})$ is a prior distribution of $\tilde{x}$ and can be previously calculated offline.

Secondly, a method of using a reference signal in the serving cell may be considered. Minimizing a residual error by perfectly accomplishing a cancellation of a serving signal may be favorable to interference signal classification. For this reason, the terminal may use the reference signal of the serving cell (e.g., common reference signal, CRS) that the terminal perfectly knows. When using the above method, the interference signal classification may be performed only in the resource element (RE) where serving CRS is located. For reference, according to LTE system standards, CRS symbols which are transmitted from 2 Tx antenna are located in the 12 REs in the PDSCH region expect the PDCCH region within 1 RB. The optimal interference signal classification according to above method is expressed as Equation 6.

$$\hat{m} = \operatorname*{argmax}_{m \in M} \left\{ \prod_{k=1}^{12} \sum_{\tilde{x}_i \in S_m^2} \frac{1}{(\pi\sigma^2)^2} \right.$$

Equation 6

$$\exp\left(-\frac{1}{\sigma^2}\|Y(k) - H_d(k)s_d(k) - H_i(k)\tilde{x}_i\|^2\right)P(\tilde{x})\Bigg\}$$

Where, Sd(k) is k-th CRS symbol vector of serving cell in 1 RB.

After acquiring serving signal information by using one of the above mentioned two methods, the terminal proceeds to operation 630, and detects an interference target signal by canceling the serving signal from the signal received at the previous operation. Here, the interference target signal is a sampled signal to finally acquire dominant interference signal.

Then, the terminal proceeds to operation 640, and checks the precoding symbol constellation set. The precoding symbol constellation set may have a combinable constellation as an element by using an input parameter such as transmission mode information, layer information, and modulation order information. The precoding symbol constellation set may be provided (stored) by the terminal itself, but may also be received from the service provider.

After that, the terminal proceeds to operation 650, and compares the interference target signal, excluding the serving signal from the received signal, with the stored precoding symbol constellation set. The terminal determines whether the constellation corresponding to the interference target signal exists in the precoding symbol constellation set at operation 660. Here, the finding of a corresponding constellation may correspond to finding the constellation having a signal distribution that is closest to the signal distribution of interference target signal.

When the constellation exists, the terminal proceeds to operation 670, and acquires information on dominant interference signal according to the constellation which corresponds (mapped) to the interference target signal. In this case, the information on dominant interference signal acquired by the terminal may include the information related to the transmission mode, the layer, the modulation order, and the precoding matrix.

The terminal proceeds to operation 680, and decodes the received signal based on the acquired information on dominant interference signal. In this case, the terminal may use the methods such as the joint detection, the interference cancellation, and the like so as to decode the received signal.

Figure 7:
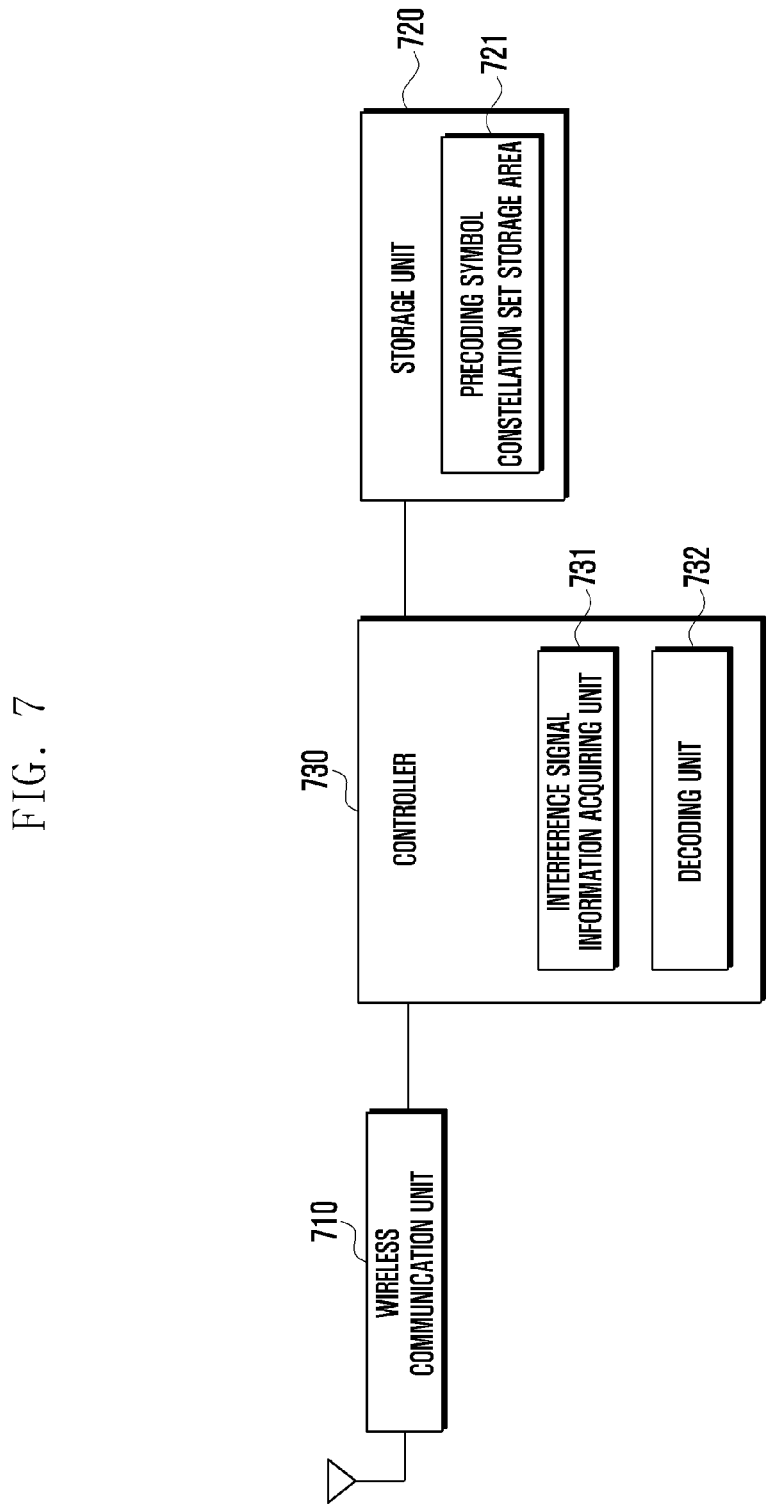
FIG. 7 is a block diagram illustrating an internal structure of a terminal according to an embodiment of the present disclosure.

FIG. 7 is a block diagram illustrating an internal structure of a terminal according to an embodiment of the present disclosure.

As illustrated in FIG. 7, the terminal of the present disclosure may include a wireless communication unit 710, a storage unit 720, and a controller 730.

The wireless communication unit 710 may perform a function of transmitting/receiving a corresponding data for a wireless communication terminal. The wireless communication unit 710 may include a RF transmitter which performs up conversion and amplification of a frequency of a transmitted signal, and a RF receiver which performs a low-noise amplification of the received signal and down-conversion of the frequency of the received signal. Moreover, the wireless communication unit 710 may receive data through a wireless channel to output to a controller 730, and transmit data outputted from the controller 730 through the wireless channel.

The storage unit 720 may perform a function of storing a program and data necessary for the operation of the terminal, and be divided into a program area and a data area. The storage unit 720 according to an embodiment of the present disclosure may further include a precoding symbol constellation set storage area 721 storing a precoding symbol constellation set including at least one constellation which corresponds to the pattern of interference signal.

The controller 730 may control a signal flow between blocks so that the terminal may be operated according to an embodiment of the present disclosure. Particularly, the controller 730 may control consecutive procedures of acquiring interference signal information on the terminal by previously configuring the precoding symbol constellation set which corresponds to the pattern of interference signal, classifying the interference signal not by modulation symbol unit but by precoding symbol unit, and comparing the precoding symbol constellation set with the interference signal of the precoding symbol unit.

To this end, the controller 730 may further include an interference signal information acquiring unit 731 and a decoding unit 732.

The interference signal information acquiring unit 731 may acquire interference signal information based on the precoding symbol constellation set stored in the storage unit 720, particularly, in the precoding symbol constellation set storage area 721. According to an embodiment of the present disclosure, the acquired interference signal information may be precoded symbol unit.

Particularly, the interference signal information acquiring unit 731 may acquire interference target signal by canceling the serving signal from the received signal, and checking the constellation which corresponds to the interference target signal by comparing the interference target signal with the precoding symbol constellation set. The interference signal information acquiring unit 731 may determine the information according to the checked constellation as interference signal information.

In this case, the interference signal information acquiring unit 731 may cancel the serving signal from the received signal by using the reference signal of a serving cell. Alternatively, the interference signal information acquiring unit 731 may regenerate the serving signal by using a result of decoding processing when there is the result of decoding processing, and cancel the regenerated serving signal from the received signal by using the regenerated serving signal.

The decoding unit 732 may receive information on an interference signal acquired from the interference signal information acquiring unit 731 and decode the received signal. The information on the interference signal may be a precoded symbol unit and include transmission mode information of a precoded symbol, layer information, and modulation order information, and the like.

The decoding unit 732 may use the methods such as the joint detection, the interference cancellation, and the like so as to decode a received signal.

According to the present disclosure, the terminal may acquire dominant interference signal information in the cell edge and improve its reception performance by using an advanced receiver such as the joint detection, the interference cancellation, and the like. In addition, the improvement of reception performance of a terminal in the cell edge may lead to the increase of the system throughput. Further, according to the present disclosure, without changing the conventional system standard of an LTE system, the reception performance of a terminal in the cell edge may be improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal in a wireless communication system, the method comprising:
   storing a pre-configured constellation set:
   receiving a signal from a base station;
   identifying a constellation among the pre-configured constellation set by selecting the constellation having a closest signal distribution with an interference target signal, the interference target signal being acquired by canceling a serving signal from the received signal;
   acquiring interference signal information on the received signal based on the identified constellation; and
   cancelling an interference signal from the received signal by using the acquired interference signal information.

2. The method of claim 1, wherein the pre-configured constellation set includes at least one constellation which corresponds to a pattern of the interference signal.

3. The method of claim 1, wherein the acquiring of the interference signal information comprises acquiring interference signal information in a pre-coded symbol unit.

4. The method of claim 1, wherein the identifying of the constellation among the pre-configured constellation set comprises:
   comparing a signal distribution of the interference target signal with each signal distribution of the pre-configured constellation set.

5. The method of claim 1, wherein the acquiring of the interference target signal comprises cancelling the serving signal from the received signal by using a reference signal of a serving cell.

6. The method of claim 1, wherein the acquiring of the interference target signal further comprises:
   regenerating the serving signal by using a result of decoding processing if the result of decoding processing exists; and
   cancelling the regenerated serving signal from the received signal by using the regenerated serving signal.

7. The method of claim 1, wherein the pre-configured constellation set is configured based on a combination of at least two of transmission mode information, layer information, precoding information and modulation order information.

8. A terminal in a wireless communication system, the terminal comprising:
   a wireless communication unit configured to transmit and receive signals with a base station;
   a storage unit; and
   a controller configured to:
      store a pre-configured constellation set,
      control the wireless communication unit to receive a signal from the base station,
      identify a constellation among the pre-configured constellation set by selecting the constellation having a closest signal distribution with an interference target signal, the interference target signal being acquired by canceling a serving signal from the received signal,
      acquire interference signal information on the received signal based on the identified constellation, and
      cancel the interference signal from the received signal by using the acquired interference signal information.

9. The terminal of claim 8, wherein the pre-configured constellation set includes at least one constellation which corresponds to a pattern of the interference signal.

10. The terminal of claim 8, wherein the controller is further configured to:
    compare a signal distribution of the interference target signal with each signal distribution of the pre-configured constellation set.

11. The terminal of claim 8, wherein the controller is further configured to cancel the serving signal from the received signal by using a reference signal of a serving cell.

12. The terminal of claim 8, wherein the controller is further configured to:
    regenerate the serving signal by using a result of decoding processing when the result of decoding processing exists; and
    cancel the regenerated serving signal from the received signal by using the regenerated serving signal.

13. The terminal of claim 8, wherein the pre-configured constellation set is configured based on a combination of at least two or transmission mode information, layer information, precoding information and modulation order information.

14. A method of in a wireless communication system, the method comprising:
    storing a pre-configured constellation set;
    receiving a signal including a serving signal and an interference signal;
    acquiring serving signal information from the serving signal;
    cancelling the serving signal from the received signal;
    identifying a constellation set among the pre-configured constellation set by selecting the constellation having a closet signal distribution with an interference target signal, the interference target signal being acquired by canceling the serving signal from the received signal;
    acquiring interference signal information on the received signal based on the identified constellation; and
    decoding the received signal based on the acquired interference signal information.

15. The method of claim 14, wherein the pre-configured constellation set is generated based on a combination of at least two of transmission mode information, layer information, precoding information and modulation order information.

16. A non-transitory computer readable medium for storing a computer program of instructions configured to be readable by at least one processor for instructing the at least one processor to execute a computer process for performing the method of claim 14.

17. A non-transitory computer readable medium for storing a computer program of instructions configured to be readable by at least one processor for instructing the at least one processor to execute a computer process for performing the method of claim 1.

* * * * *